(12) United States Patent
Condon

(10) Patent No.: US 6,805,522 B2
(45) Date of Patent: Oct. 19, 2004

(54) MOTORCYCLE AND ALL-TERRAIN VEHICLE MOUNTED TIE DOWN BRACKET

(75) Inventor: Duane R. Condon, Ramona, CA (US)

(73) Assignee: Ring Products, Chino Hills, CA (US)

( * ) Notice: Subject to any disclaimer, the term of this patent is extended or adjusted under 35 U.S.C. 154(b) by 0 days.

(21) Appl. No.: 10/238,424

(22) Filed: Sep. 10, 2002

(65) Prior Publication Data

US 2003/0049090 A1 Mar. 13, 2003

Related U.S. Application Data

(60) Provisional application No. 60/318,376, filed on Sep. 10, 2001.

(51) Int. Cl.[7] ................................................. B60P 7/08
(52) U.S. Cl. ................................. 410/3; 410/7; 410/12; 410/23; 410/100; 410/102
(58) Field of Search .................. 410/2, 3, 4, 7, 410/12, 23, 97, 100, 102, 116; 224/555, 563, 568, 924; 248/499; 24/265 CD

(56) References Cited

U.S. PATENT DOCUMENTS

| | | | |
|---|---|---|---|
| 4,072,257 A | 2/1978 | Hall | |
| 4,078,821 A | 3/1978 | Kitterman | |
| 4,243,243 A | 1/1981 | Edmisten | |
| 4,441,736 A | 4/1984 | Shedden | |
| 4,752,177 A | 6/1988 | Zenna | |
| 4,842,458 A * | 6/1989 | Carpenter | 410/3 |
| 4,852,779 A | 8/1989 | Berg | |
| 5,326,202 A | 7/1994 | Stubbs | 410/3 |
| 5,529,448 A | 6/1996 | Kosma | 410/97 |
| 5,823,723 A * | 10/1998 | Finch | 410/22 |
| 6,065,914 A * | 5/2000 | Fotou | 410/3 |
| 6,171,034 B1 * | 1/2001 | Burgoon et al. | 410/3 |
| 6,331,094 B1 * | 12/2001 | Burrows | 410/30 |
| 6,524,041 B1 * | 2/2003 | Voiculescu | 410/100 |
| 6,641,342 B1 * | 11/2003 | Girardin | 410/106 |
| 2003/0059269 A1 * | 3/2003 | Bosley | 410/100 |
| 2003/0103831 A1 * | 6/2003 | Alderman | 410/100 |
| 2003/0143051 A1 * | 7/2003 | Jackson | 410/3 |
| 2003/0152436 A1 * | 8/2003 | Trauthwein | 410/97 |

* cited by examiner

Primary Examiner—Stephen Gordon
(74) Attorney, Agent, or Firm—Steins & Associates, P.C.

(57) ABSTRACT

A Motorcycle and All-Terrain Vehicle Mounted Tie Down Bracket is disclosed. Also disclosed is a device that easily attaches to a conventional cycle or vehicle "triple clamp" and remains there during normal use of the cycle or vehicle. The device includes a portion for bolting to the cycle or vehicle as well as a portion for hooking a conventional tie-down strap through. The tie-down portion is bent out respective to the mounting portion in order to make it easier to reach the tie-down portion for tying it down.

9 Claims, 6 Drawing Sheets

MOTORCYCLE AND ALL-TERRAIN VEHICLE MOUNTED TIE DOWN BRACKET

The present invention relies for priority upon Provisional Application Ser. No. 60/318,376, filed Sep. 10, 2001 under 35 U.S.C. §119(e).

BACKGROUND OF THE INVENTION

1. Field of the Invention

This invention relates generally to accessories for motorcycles and the like and, more specifically, to a Motorcycle and All-Terrain Vehicle Mounted Tie Down Bracket

2. Description of Related Art

Many devices are known for tying down a motorcycle or ATV for transporting on a trailer or truck. Examples in the field include: U.S. Pat. Nos. 4,078,821, 4,243,243, 4,852, 779, 5,529,448, 5,326,202, 4,752,177, 4,441,736 and 4,072, 257. These references discuss a variety of utility trailers, stabilizing hitches, racks, hand grip mounts, strapping systems and suspension wear reducers for towing or carrying a motorcycle or ATV.

For reference purposes, FIG. 1 is provided. FIG. 1 is a perspective view of a conventional dirt bike 10. The typical arrangement for mounting the front wheel 12 to the conventional dirt bike 10 (as well as ATV's and ATC's) is via a fork assembly 14. The fork assembly 14 generally consists of a left fork tube 16, a right fork tube 18 and a handlebar pivot tube 20. These three tubes 16, 18 and 20 are interconnected by an upper triple clamp 22A and a lower triple clamp 22B.

To transport motorcycles or ATV's, tie down straps are typically used to secure the transported vehicle in the bed of a truck, box van, trailer or other transporting vehicle. FIG. 2 is a perspective view of a conventional tie-down strap 50. Tie-down straps typically consist of a pair of nylon straps 52A and 52B interconnected by a tensioning device 54, such as a clamp or ratcheting assembly. Hooks 56A and 56B are attached to the distal ends of the straps 52A and 52B. In use, the typical practice is to place one hook 56 on the motorcycle or ATV steering handle bar, and attach the other hook to an eyelet or other attachment point on the transporting vehicle—at an approximate angle of 45 degrees. This method is repeated using a second tie-down strap on the opposite side of the motorcycle or ATV. When tension is applied to both tie-down straps, the vehicle's front suspension is compressed, creating retaining force against the surface of the transporting vehicle. This spring-like tension holds the motorcycle or ATV securely in place for transport.

Utilizing the motorcycle's or ATV's handlebar as an attachment point for a tie-down strap has several disadvantages. When the vehicle is transported, vibration and motion will cause the nylon strap or hook to rub against various components on the motorcycle or ATV, potentially causing damage at these locations. Damage to electrical wires, control cables, body fairings and even the handlebars themselves is common, creating additional operating expense as well as potential safety hazards due resulting from component failure. Furthermore, the tie-down hook 56 can slide along the handlebar, thus loosening the tensioning force and creating the possibility of losing the transported vehicle.

None of the aforementioned references solve these problems adequately. In fact, U.S. Pat. No. 4,078,821 includes hose clamps 109 and a pin 107 which, when secured to the frame member 93 of the motorcycle, will scratch the paint and possibly even create a dent. What is needed, therefore, is a restraint device and system for motorcycles and ATV's that provides reliable security without causing damage to the motorcycle or ATV.

SUMMARY OF THE INVENTION

In light of the aforementioned problems associated with the prior devices and methods, it is an object of the present invention to provide a Motorcycle and All-Terrain Vehicle Mounted Tie Down Bracket. The device should easily attach to a conventional cycle or vehicle "triple clamp" and remain there during normal use of the cycle or vehicle. The device should include a portion for bolting to the cycle or vehicle as well as a portion for hooking a conventional tie-down strap through. The tie-down portion should be bent out respective to the mounting portion in order to make it easier to reach the tie-down portion.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Motorcycle and All-Terrain Vehicle Mounted Tie Down Bracket.

Figure 1:
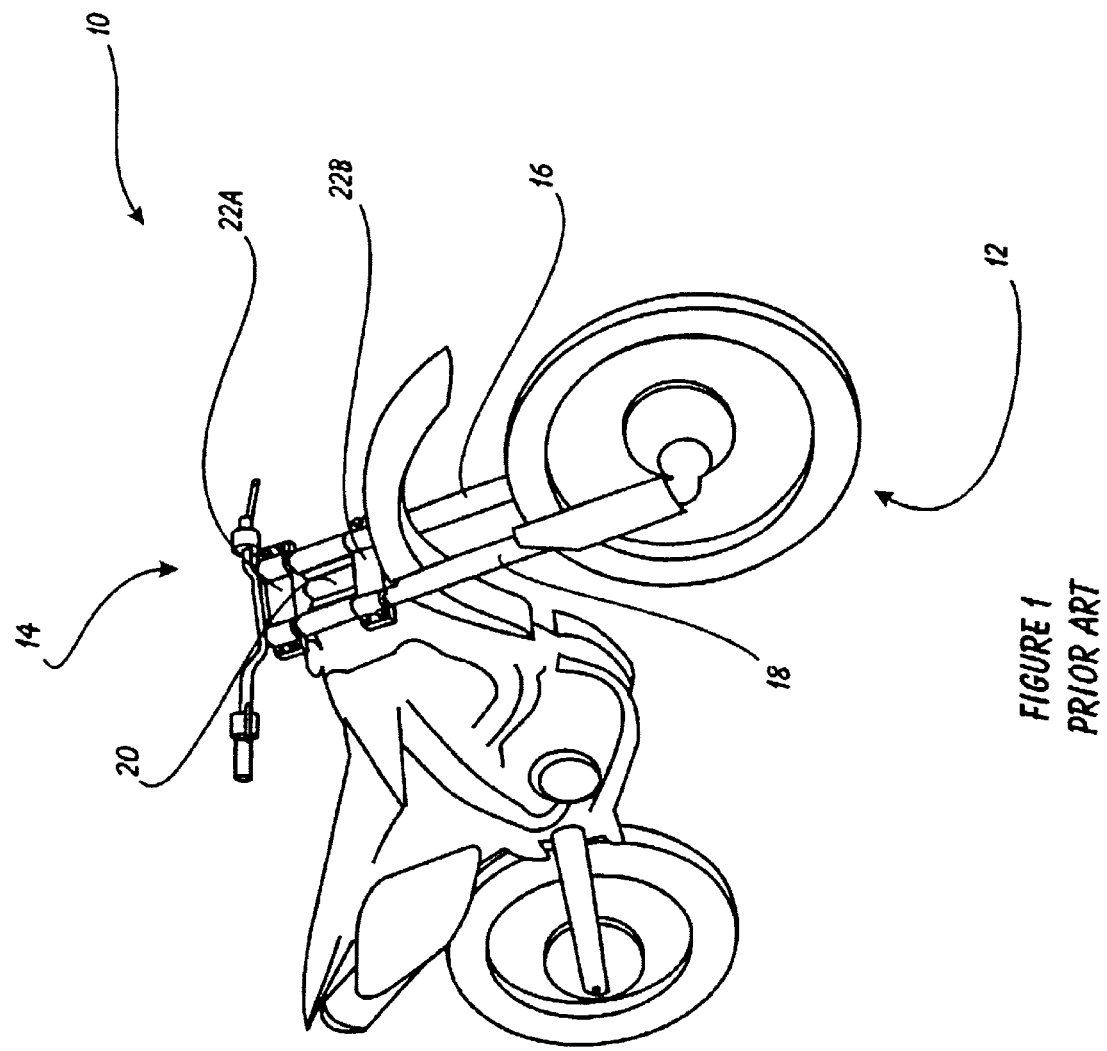
FIG. 1 is a perspective view of a conventional dirt bike.
Figure 2:
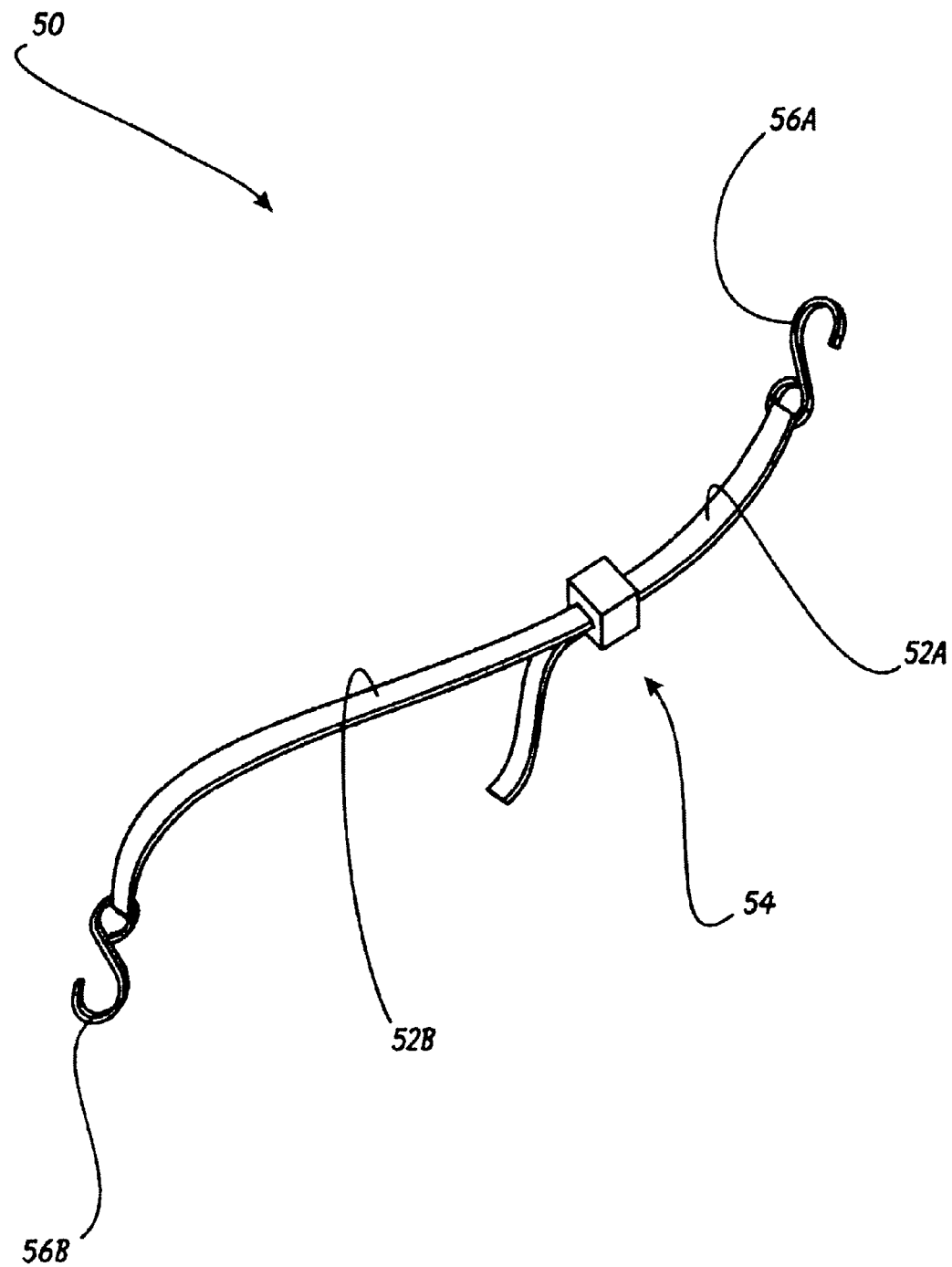
FIG. 2 is a perspective view of a conventional tie-down strap.
Figure 3:
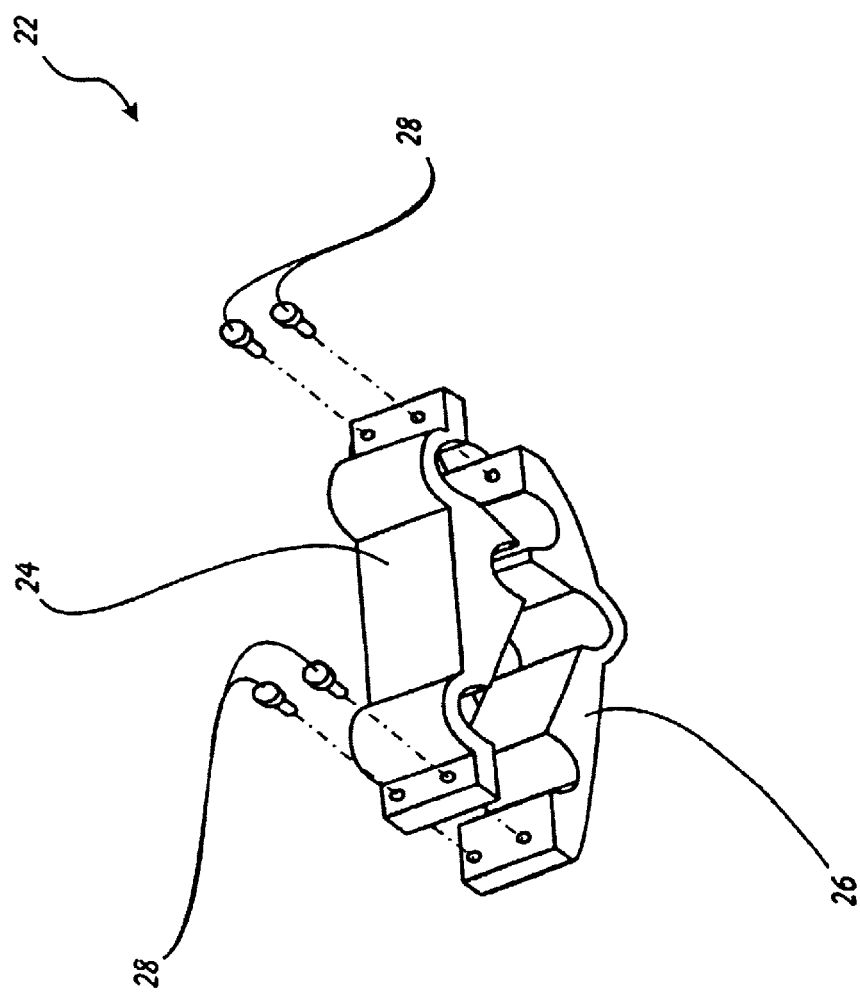
FIG. 3 is a perspective view of a conventional triple clamp.

The present invention can best be understood by initial consideration of FIG. 3. FIG. 3 is a perspective view of a conventional triple clamp 22, such as those depicted above in connection with FIGS. 1 and 2. Although many different shapes and sizes are used, they all typically have the following common elements: The front bracket 24, the rear bracket 26 and a plurality of assembly bolts 28 for attaching the two brackets 24 and 26 to one another, thereby clamping the fork tubes and pivot tube (not shown) firmly together. Having briefly discussed the conventional triple clamp, we shall now turn to FIG. 4 to discuss the details of the present invention.

Figure 4:
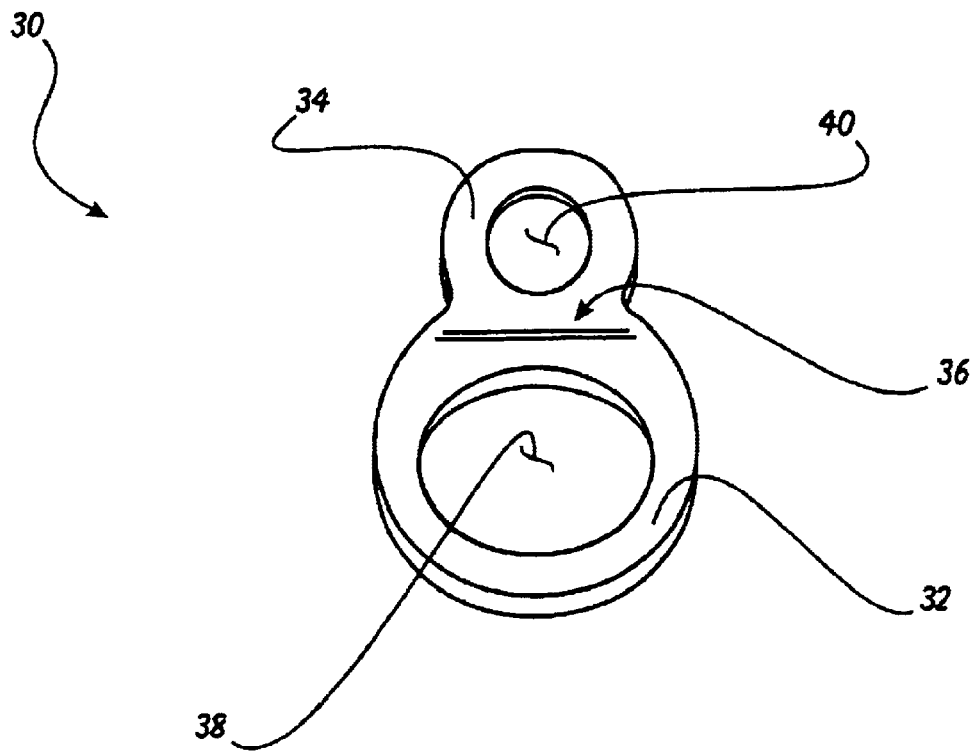
FIG. 4 is a front view of a preferred tie-down bracket of the present invention.

FIG. 4 is a front view of a preferred tie-down bracket 30 of the present invention. As shown, the bracket 30 comprises a tie-down tab 32 and a mounting tab 34 which meet at the crease 36 formed in the bracket 30. The tie-down tab 32 is generally flat and circular in shape, and is further defined by a tie-down aperture formed therethrough.

Similarly, the mounting tab 34 is generally flat and circular in shape, an it is further defined by a mounting aperture formed therethrough. In most situations (as is also depicted here), the diameter of the tie-down tab and tie-down aperture are typically larger than the diameter of the mounting tab and mounting aperture. The larger diametered tie-down elements provide ease in attaching and detaching the tie-down straps; the smaller diameteted mounting elements reduce any interference with the steering of the cycle or vehicle. The bracket 30 is shown from another vantage point in FIG. 5.

Figure 5:
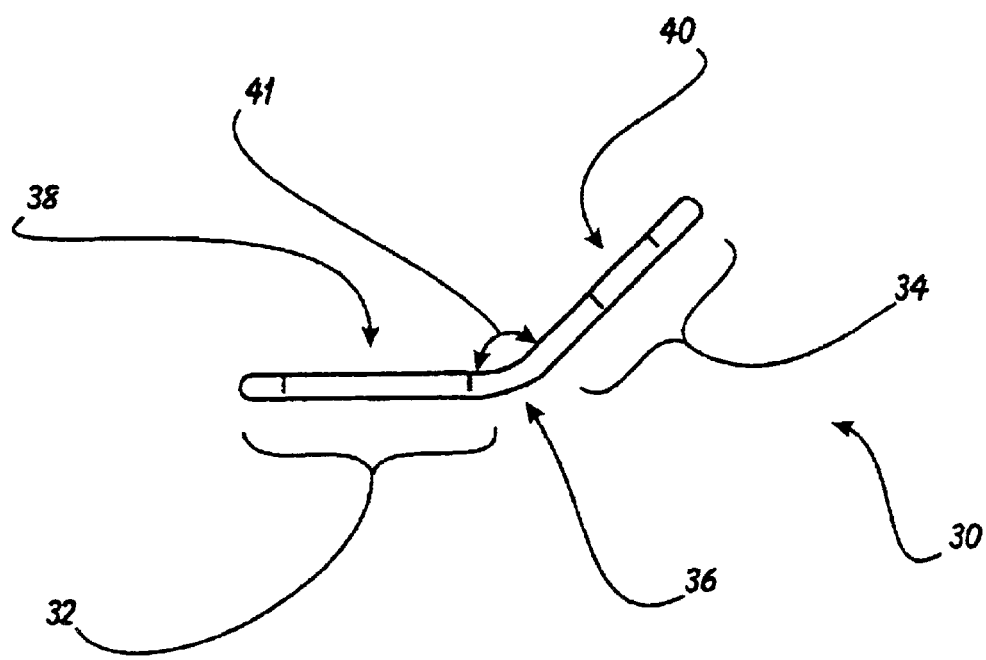
FIG. 5 is a side view of the bracket of FIG. 4.

FIG. 5 is a side view of the bracket 30 of FIG. 4. As shown with hidden lines, the apertures 38 and 40 pass entirely through the tic-down tab 32 and mounting tab 34, respectively. The angle 41 between the tie-down tab 32 and the mounting tab 34 can vary for different embodiments of the bracket 30, but it is shown here to be approximately 45 degrees. In fact, in some embodiments, the crease 36 may be eliminated, and the bracket 30 will be entirely flat. The material used to construct the bracket 30 is chosen from the variety of metals and composites to provide a strong, durable device that will resist corrosion, wear, cracking or other failure. Now we will turn to FIG. 6 to examine how simply a conventional cycle or ATV can be modified with the present invention.

Figure 6:
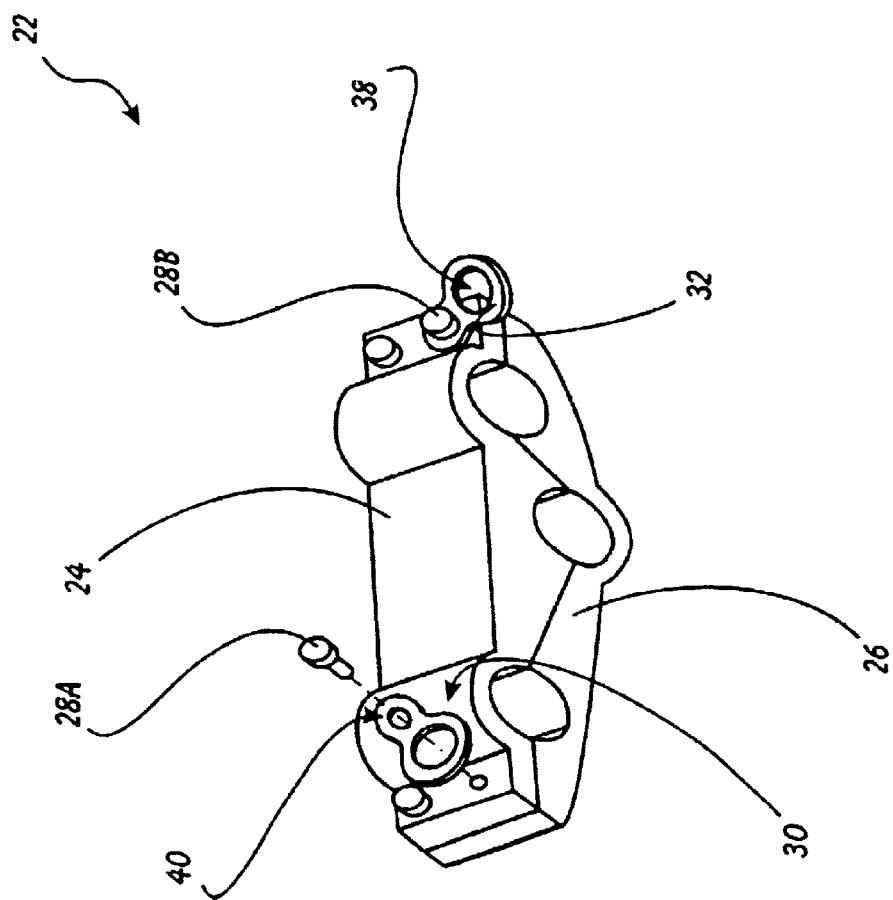
FIG. 6 is a partially exploded perspective view of a pair of brackets of FIGS. 4 and 5 installed on a conventional triple clamp.
Figure 7:
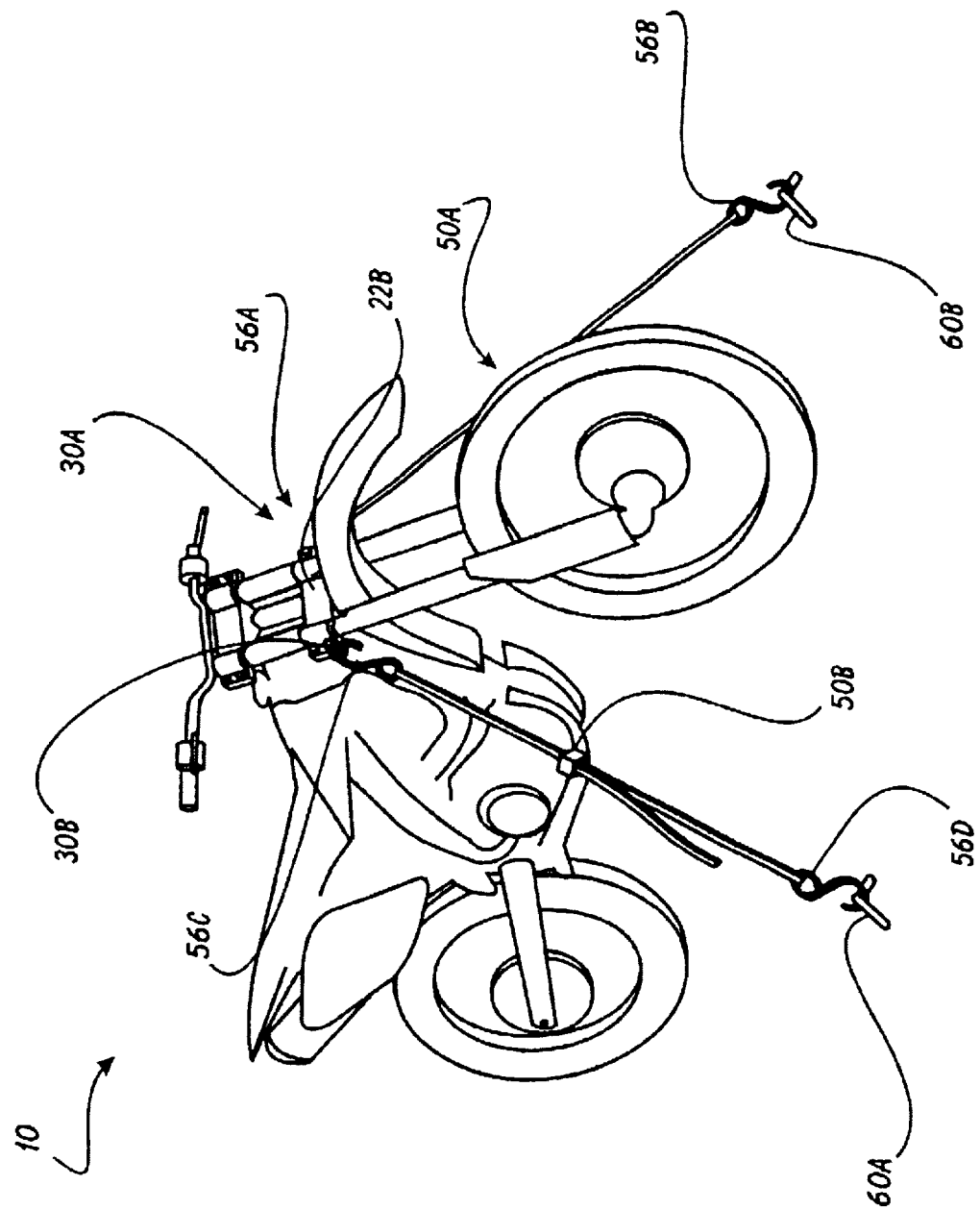
FIG. 7 is a perspective view of a dirt bike tied down utilizing the brackets of FIGS. 4–6.

FIG. 6 is a partially exploded perspective view of a pair of brackets 30 of FIGS. 4 and 5 installed on a conventional triple clamp 22. To install, the user need simply remove the two lower assembly bolts 28A and 28B, thread the bolt 28 through the mounting aperture 40, and re-tighten the assembly bolt 28 securely. As depicted on the left side (as viewed from the cycle), the bracket 30 is completely installed and retained firmly in place by the assembly bolt 28B. Due to the unique shape of the bracket 30, the tie-down tab 32 and tie-down aperture 38 extend clear of the triple clamp 22 as well as the other components of the cycle or vehicle (not shown), particularly when the tie-down straps are attached at an outward angle of forty-five degrees (the conventional approach). FIG. 7 depicts how a cycle restrained using these novel brackets 30 would look.

FIG. 7 is a perspective view of a dirt bike 10 tied down utilizing the brackets 30 of FIGS. 4–6. In this example, a pair of eyelets 60A and 60B are provided on the surface (e.g. the trailer bed) for tying the dirt bike 10 to. A pair of tie-down straps 50A and 50B connect between the brackets 30A and 30B now extending outwardly from the lower triple clamp 22B. As can be seen, the straps 50 have been tightened until they are in condition for transporting the bike 10. The brackets 30 extend outward from the triple clamp 22B enough so that the hooks 56A and 56C cart be attached thereto and still permit the straps 50 to clear the other components on the dirt bike 10. Since the overall profile of the brackets 30 is small, when the user wishes to use the bike 10, he or she need merely disconnect the tie-down straps— no removal of the brackets 30 is necessary. Devices 56B and 56D are conventional tie-down hooks (as are hooks 56A and 56C), which are attached hare to eyelets 60A and 60B.

A further point is that the brackets 30 can be attached to either the upper or lower triple clamp on the cycle or vehicle; depending upon the particular cycle or vehicle, one or the other clamp 22 may provide easier access and more convenience. Furthermore, the brackets 30 may be installed at the upper assembly bolts rather than the lower assembly bolts.

Certainly, it is expected that on certain types of vehicles it will be best to attach the brackets to other locations on the vehicle (e.g. other structural assembly bolts)—the configuration of the bracket 30 of the present invention is versatile and strong enough to accommodate such installation approaches. The example depicted and discussed herein was for triple clamp installation since most cycles and ATV's are tied down with the most stability at this location.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for tying down a vehicle, said vehicle comprising a left and a right assembly bolt, the method comprising the steps of:

removing said left and right assembly bolts;

inserting one said assembly bolt through a mounting aperture formed in a tie-down bracket;

reinstalling said one assembly bolt and tie-down bracket;

inserting the other said assembly bolt through a mounting aperture formed in a second tie-down bracket;

reinstalling said other said assembly bolt and second tie-down bracket; and attaching tie-down strap means for tying down devices to said tie-down brackets; and tightening said tie-down strap means.

2. The method claim 1, wherein:

said first and second insertings comprise inserting said assembly bolt through a mounting aperture formed in a tie-down bracket, said tie-down bracket further defined by a mounting tab though which said mounting aperture is formed and a tie-down tab extending from said mounting tab.

3. The method claim 2, wherein:

said first and second insertings comprise inserting said assembly bolt through said mounting aperture formed in said tie-down bracket, said tie-down bracket further defined by said mounting tab through which said mounting aperture is formed and said tie-down tab extending from said mounting tab at an angle of less than 180 degrees.

4. The method of claim 1, wherein said tie-down brackets of said inserting said reinstalling and said attaching steps each comprise:

a substantially flat mounting tab;

a substantially flat tie-down tab opposing said mounting tab; and a creased portion interconnecting said mounting tab and said tie-down tab.

5. The method of claim 4, wherein said mounting tab of each said tie-down bracket of said inserting, said reinstalling and said attaching steps is further defined by a mounting aperture formed therethrough, said mounting aperture defining a diameter.

6. The method of claim 5, wherein said tie-down tab of each said tie-down bracket of said inserting, said reinstalling and said attaching steps is further defined by a tie-down aperture formed therethrough, said tie-down aperture defining a diameter.

7. The method of claim 6, wherein said tie-down aperture diameters of said tie-down brackets of said inserting, said reinstalling and said attaching steps exceed said mounting aperture diameters of said tie-down brackets.

8. The method of claim 4, wherein said creased portion of each said tie-down bracket of said inserting, said reinstalling and said attaching steps consists of a bend between said mounting tab and said tie-down tab, said bend creating an angle of less than 180 degrees between said mounting tab and said tie-down tab.

9. The method of claim 8, wherein said angle of said bend of said creased portion of each said tie-down bracket of said inserting, said reinstalling and said attaching steps substantially comprises 135 degrees.

\* \* \* \* \*